Oct. 20, 1925.
C. A. ANDERSEN
ARTIFICIAL BAIT
Filed May 5, 1925
1,557,644
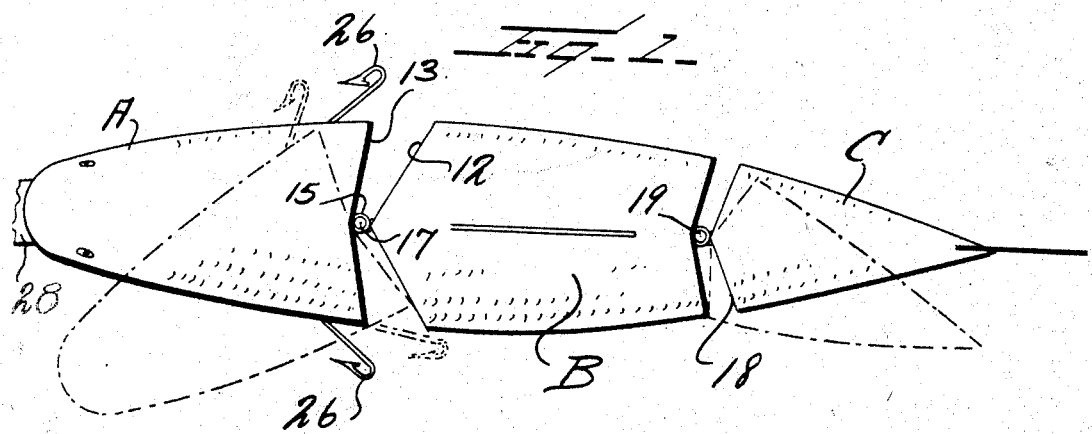
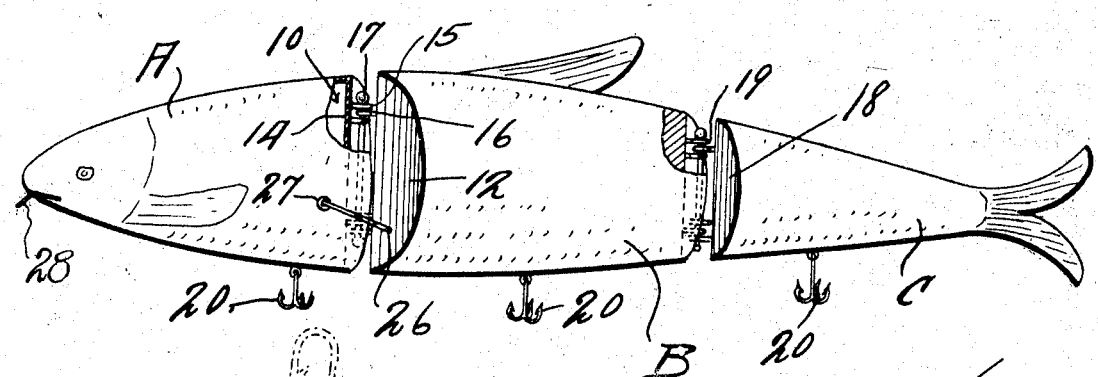
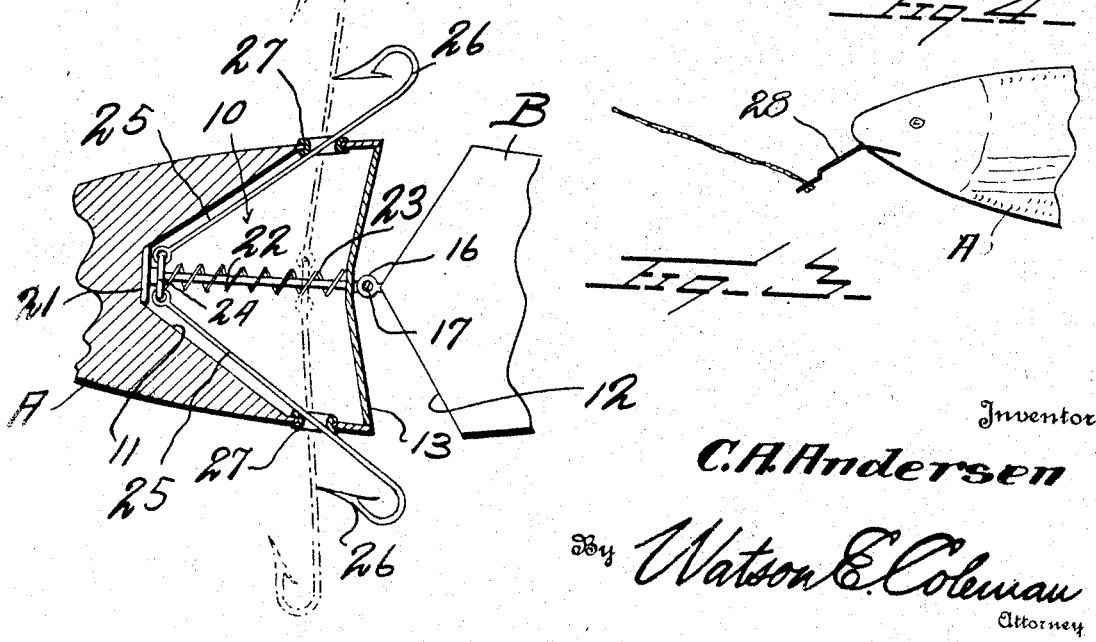
Inventor
C. A. Andersen
By Watson E. Coleman
Attorney Patented Oct. 20, 1925.

1,557,644

UNITED STATES PATENT OFFICE.

CHRISTIAN A. ANDERSEN, OF WATERTOWN, SOUTH DAKOTA.

ARTIFICIAL BAIT.

Application filed May 5, 1925. Serial No. 28,233.

*To all whom it may concern:*

Be it known that I, CHRISTIAN A. ANDERSEN, a citizen of the United States, residing at Watertown, in the county of Codington and State of South Dakota, have invented certain new and useful Improvements in Artificial Bait, of which the following is a specification, reference being had to the accompanying drawings.

This invention relates to artificial bait in the form of minnows, and particularly to artificial minnows having normally retracted hooks concealed or partially concealed within the body of the minnow.

One of the objects of the invention is to provide a minnow of this character in which these hooks are very simply mounted in a retracted position but in which the hooks swing outward when a fish strikes, the strain on the hooks caused by the pressure of a spring acting to cause the full and clean hooking of the fish if the fish once strikes.

A further object is to provide an artificial minnow constructed of a plurality of sections, the sections being pivoted to each other for flexing movement in a plane at right angles to the vertical plane, the sections being so formed at their abutting edges as to permit a relatively free flexing of the several sections so that the minnow will readily wobble.

Other objects will appear in the course of the following description.

My invention is illustrated in the accompanying drawing, wherein:—

Figure 1 is a top plan view of an artificial bait constructed in accordance with my invention, showing in dotted lines the manner in which the bait is flexed;

Figure 2 is a side elevation of the bait shown in Figure 1, parts of the bait being broken away;

Figure 3 is an enlarged sectional view of the rear of section A and forward portion of middle section B;

Referring to this drawing, it will be seen that my improved bait is in the form of a minnow and is formed preferably of three sections A, B and C, the section A being the head section, C being the tail section, and B being the intermediate section. The section A is formed with a recess 10 extending downward from the upper surface of the section A and extending rearwardly to the rear or butt end of this section, as shown, the walls 11 of the recess 10 being rearwardly divergent. The section B at its end confronting the section A is formed with rearwardly divergent walls or faces 12 which are, however, adapted to more or less fit against the faces 13 on the butt end of the section A when the bait flexes, and the two sections are held together by a hinge joint disposed along the vertical axis of the two sections.

As illustrated, this hinge joint consists of a transversely extending bar or bars 14 formed to provide eyes 15 at the middle of the bait and like eyes 16 are disposed upon the section B and engaged with a pintle 17. Thus the section B has free lateral swinging movement through a certain range with reference to the section A. The section C is likewise cut away at its forward end, as at 18, and is hinged or pivoted at its middle, as at 19, to the section B so that this section C likewise has a certain amount of play.

While I have illustrated three sections, it will be understood more sections might be used. Preferably each of the sections A and B are provided with a triple hook 20 attached to its bottom and the section C is provided with a like triple hook 20. I do not wish to be limited, however, to the number or character of the hooks attached to these sections A and B.

Disposed in the small end of the recess 11 at the forward end thereof is a plate 21 having extending from it the rod 22, which rod may support the eyes 15 of the hinge. Surrounding this rod is a coiled compression spring 23 which at its forward end bears against a small sliding plate 24 to which are pivoted the shanks 25 of the hooks 26. These shanks pass through eyes 27 mounted upon the section A, the eyes being disposed below the middle horizontal plane of the fish, and the coil spring 23 bears against this plate 24 and pushes the hooks inwardly into the position shown in full lines in Figure 3. The coiled spring 23 must be very weak, just enough to hold the hooks up when trolling, so that when a fish strikes the minnow the hooks must spread open easily.

With this construction, when a fish grabs the bait and pulls, as all fish naturally do, the hooks spread open while the coil spring 23 is compressed, resisting the outward movement of the hooks, thus holding the fish tighter the harder it pulls. Obviously the bait will be finished in proper colors and preferably should have three bloody-tooth marks on each side to attract the fish.

Obviously, however, the exterior decoration or painting of the minnow may be varied in many ways without departing from the spirit of the invention, as may the details of construction. The minnow is connected to the line in any desired manner, though preferably I provide for this purpose a small plate of thin metal designated 28 which extends forwardly and downwardly from the anterior end of the bait and to which the line is connected, said downwardly and forwardly extending plate acting to cause the bait to travel under water at a certain depth in a manner which will be obvious.

I claim:—

1. An artificial bait of the character described composed of a plurality of jointed sections, one of said sections being formed with a recess, hooks having forwardly convergent shanks disposed in said recess, eyes supporting the rear ends of said shanks, and a coiled compression spring resisting rearward movement of the forward ends of the shanks.

2. An artificial bait of the character described composed of a plurality of jointed sections, one of said sections being formed with a recess, hooks having forwardly convergent shanks disposed in said recess, eyes supporting the rear ends of said shanks, a rod mounted within said recess and extending longitudinally, a coiled compression spring on said rod, a bearing for the rear end of the spring, a plate sliding upon the rod, and a spring surrounding the rod and resisting the rearward movement of the plate, the forward ends of the hook shanks being pivotally connected to said plate.

3. An artificial bait of the character described consisting of a plurality of sections, the forward section having a forwardly extending triangular recess, the next succeeding section having its forward end formed to provide two forwardly convergent faces, a hinge connection between the first named section and the second named section at the apex of said convergent faces, the next succeeding sections being hinged to each other for free lateral movement, a longitudinally extending rod supported in said recess with its forward end disposed at the apex of said recess, a plate slidable longitudinally on said rod, a coiled compression spring on said rod and bearing at its forward end against said plate and resisting longitudinal movement of the plate in a direction to compress the spring, eyes mounted upon the forward section at opposite points, and hooks having shanks extending through said eyes and hingedly connected to said sliding plate.

In testimony whereof I hereunto affix my signature.

CHRISTIAN A. ANDERSEN.